Dec. 25, 1962  K. C. WOOLLEY ET AL  3,070,053
TUBE FORMING MACHINE
Filed Sept. 5, 1958  3 Sheets-Sheet 1
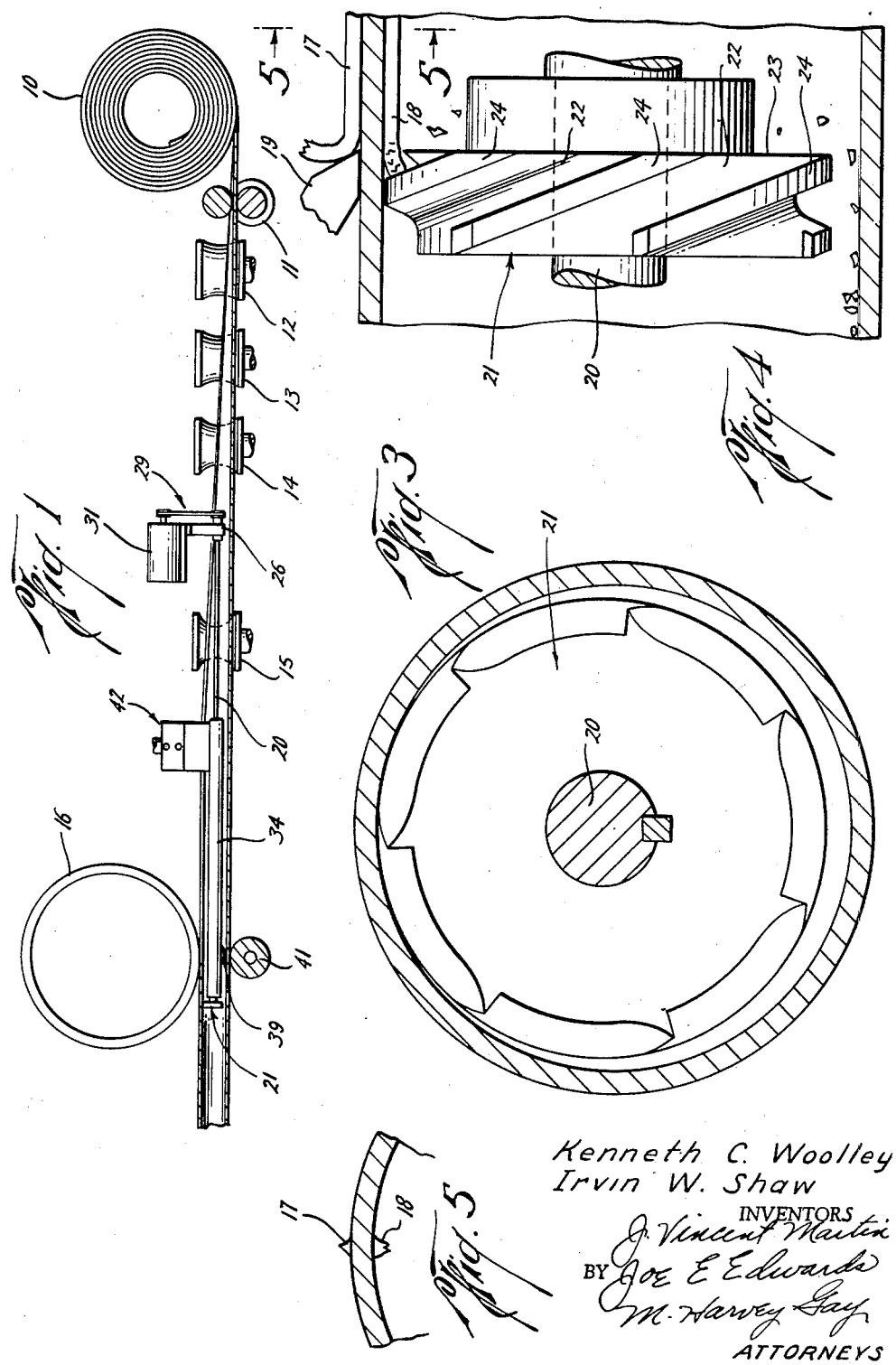
Kenneth C. Woolley
Irvin W. Shaw
INVENTORS
BY
ATTORNEYS

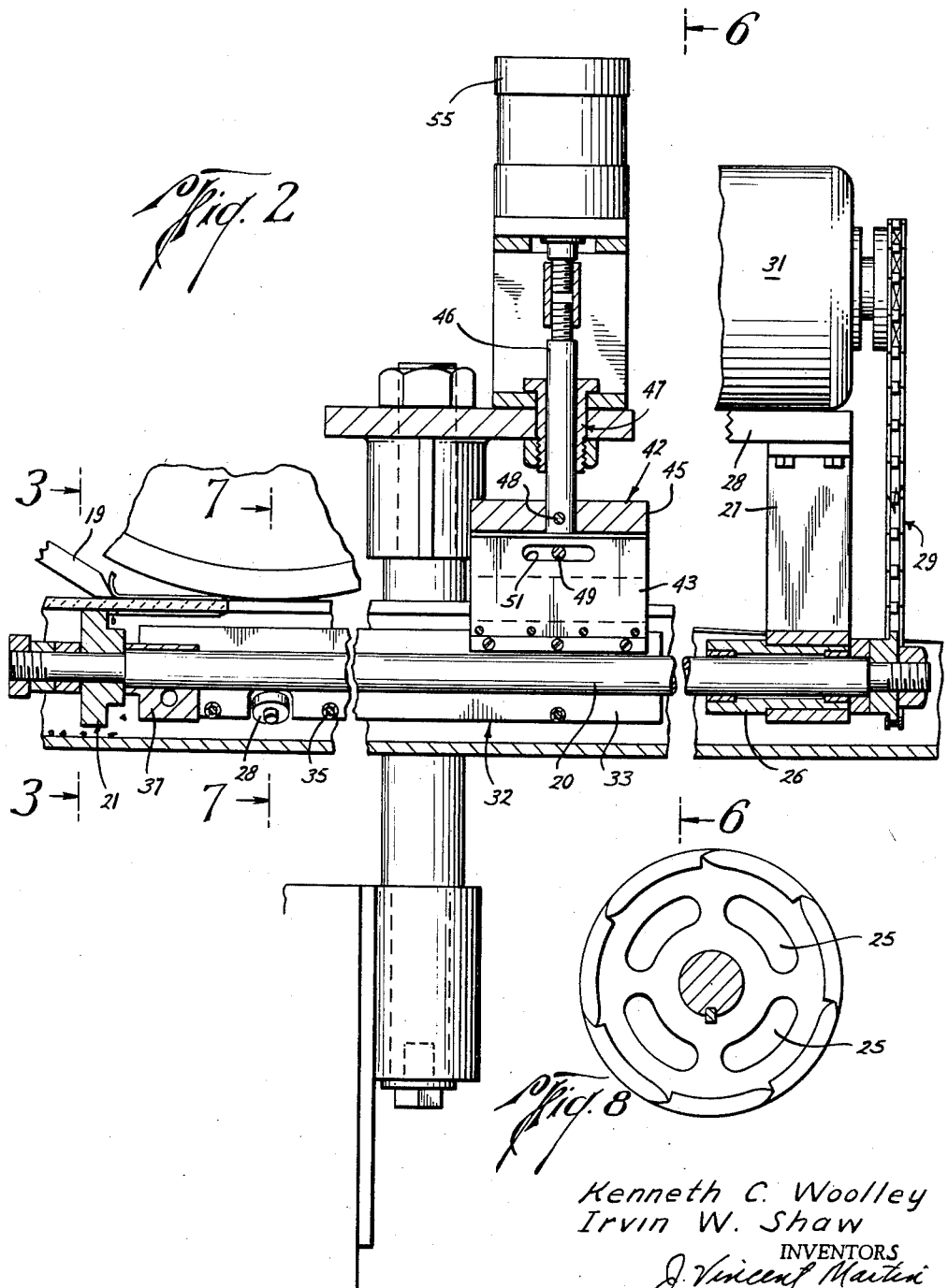

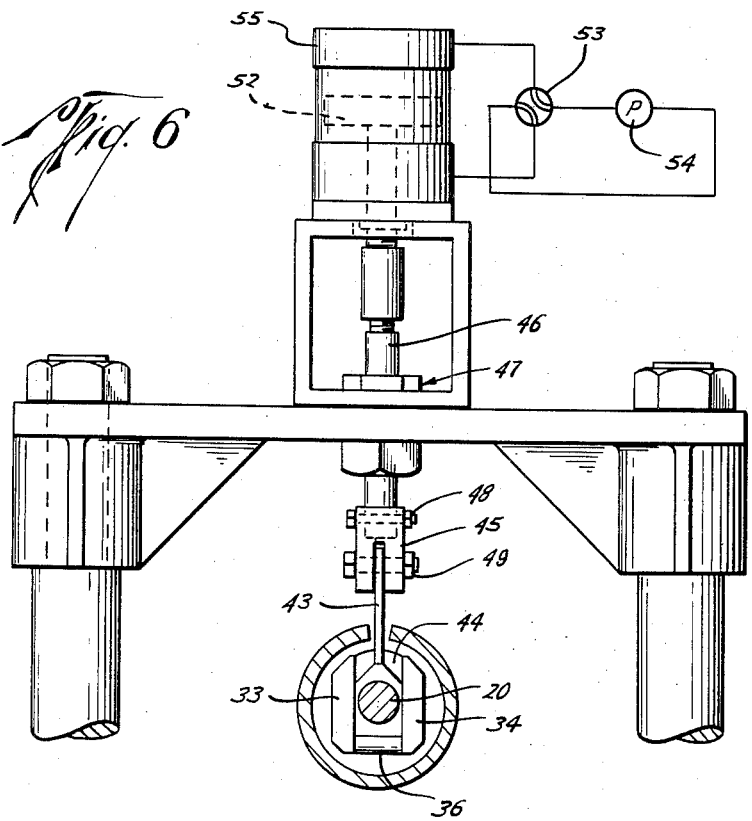
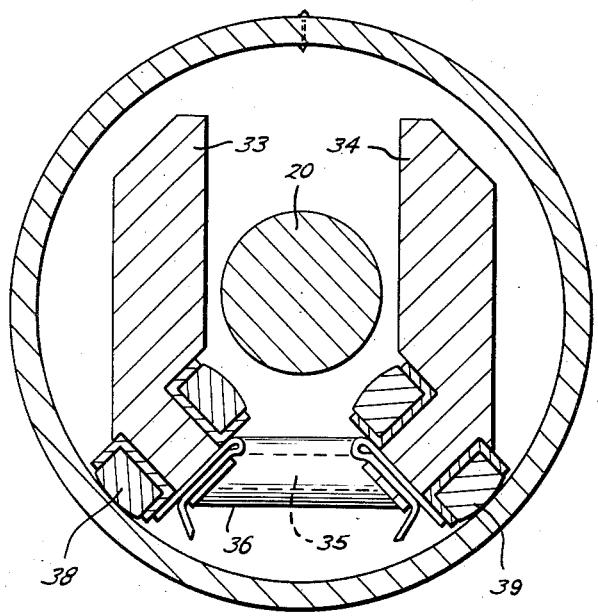
Kenneth C. Woolley
Irvin W. Shaw
INVENTORS

United States Patent Office 3,070,053
Patented Dec. 25, 1962

3,070,053
TUBE FORMING MACHINE
Kenneth C. Woolley and Irvin W. Shaw, Houston, Tex., assignors to Tex-Tube, Inc., Houston, Tex., a corporation of Texas
Filed Sept. 5, 1958, Ser. No. 759,200
6 Claims. (Cl. 113—33)

This invention relates to a tube forming machine and more particularly to a machine in which the welding flash is removed from the inside of the tube.

Tubes or pipes are formed by passing a continuous strip of metal through a machine which first forms the strip of metal into tubular form and then welds the seam. This welding process leaves flash on the interior and exterior of the tube. The exterior flash presents no problem as it may be removed with a scraping knife as it is not necessary to provide a substantially smooth exterior wall.

Handling of the interior flash is a much more difficult problem as it is desirable to provide a substantially smooth wall. This is particularly true with tubing to be used in the petroleum industry as rubber swabs, etc. are frequently run through the tubing and flash tends to tear up the swab.

In the past the inner flash has been removed with a scraping knife but this has left a continuous strip of flash metal in the pipe which has to be removed by hand. Also the knife has the problem of maintaining gauge. The welding step results in an uneven pipe wall, and it is impossible to maintain gauge with rollers positioned either along side of or axially spaced from the knife.

The inner flash has also been rolled flat, but this is objectionable as it leaves a hairline crack in the weld which induces failure. This crack is due to the V-shaped notch in the apex of the flash which is left after the welding step.

In the past there has been available no succesful way of completely removing the inner flash from a welded tube without injury to the tube, and it is an object of this invention to provide a machine for forming tubing which will remove this flash and provide a substantially smooth continuous inner wall in the tubing formed by the machine.

Tubing is normally manufactured in lengths of several hundred feet. If the inner flash is merely cut free from the tubing, it will tend to ball up, choke the cutting means and be difficult to remove from the tubing. It is, therefore, an object of this invention to both cut the flash free from the inner wall of a tube and break it into small chips which will not interfere with the cutting action and which may be readily removed from the tubing.

Due to the small space available within a tubing being formed, it is desirable to simplify the apparatus for removing and breaking the flash into chips, and it is an object of this invention to provide a cutter which will both sever the flash from the tubing wall and break it into small chips.

In removing inner flash the cutting tool must be held in position and preferably held in position in a manner which will not interfere with threading a new pipe through the machine or cause the cutter to dig into the wall of the pipe when a slightly out-of-round section of pipe passes by the cutting tool. It is, therefore, another object of this invention to provide for selectively moving the cutter from non-cutting to cutting position and thereafter maintain the cutter in operating position with a resilient force which will give slightly and permit the cutter to move with the pipe wall instead of cutting into the pipe wall with undulations in the pipe.

Another object is to provide a rotary cutter for removing the inner flash of a tube being formed which will both cut the flash free of the tube and break it into small chips.

Other objects, features and advantages of the invention will be apparent from the drawings, the specification and the claims.

In carrying out this invention a cutter and flash breaker is positioned within the tube immediately after it passes under the welding machine. Preferably both cutting and breaking are accomplished by a single rotary cutter. In rotating, the cutter constantly presents a new cutting edge to the flash to prevent overheating of the cutter. The periphery of the cutter is provided with at least one interruption such as a groove extending across the periphery of the cutter which will break off a section of removed flash. Preferably the periphery of the cutter is provided with a plurality of short overlapping helical grooves to break the flash being removed into a plurality of short chips.

The cutter is mounted in the tube on a support which extends back toward the forming rollers so that the support may be controlled by means extending through the gap in the pipe before the seam is welded.

Referring now to the drawings wherein an illustrative embodiment of this invention is shown and wherein like reference numerals indicate like parts:

FIGURE 1 is a diagrammatic view in side elevation of a tube forming machine constructed in accordance with this invention;

FIGURE 2 is a view of fragments of the machine of FIGURE 1 on an enlarged scale partly in side elevation and partly in vertical cross section;

FIGURE 3 is a view on an enlarged scale of the preferred form of rotary cutter and pipe after the flash has been removed and taken along the lines 3—3 of FIGURE 2;

FIGURE 4 is a fragmentary view on an enlarged scale partly in vertical cross section and partly in side elevation illustrating the manner in which flash is removed from a pipe;

FIGURE 5 is a fragmentary view along the lines 5—5 of FIGURE 4 showing the flash on the pipe before it has been removed;

FIGURE 6 is a view along the lines 6—6 of FIGURE 2 further illustrating the means for controlling the position of the rotary cutter;

FIGURE 7 is a view along the lines 7—7 of FIGURE 2 illustrating details of the means for supporting and rotating the rotary cutter; and FIGURE 8 is an end view of a modified form of rotary cutter.

Referring first to FIGURE 1, the flat strip of metal from which the tube is formed is purchased in rolls such as shown at 10. The ribbon of metal is fed through a plurality of rollers such as rollers 11 through 15 which shape the ribbon into tubular form. As the shaped strip of metal reaches the welding machine 16 it is completely formed except for a slit in its upper side which is closed by the welding machine 16.

As the completed tube leaves the welding machine both outer flash 17 and inner flash 18 are present. After the tube leaves the welding machine the outer flash is removed by a scraping knife 19.

In accordance with this invention the inner flash is removed by a cutter which in its preferred form is a rotary cutter indicated generally at 21. Both cutters 19 and 21 are located for engagement with the flash immediately after the weld is formed. At this time the metal is still hot and more easily removed by the cutter.

The rotary cutter 21 provides a surface on its front side which cuts the flash free from the tubing. If the flash were merely removed by a rotary cutter it would form a continuous ribbon of metal which would be constantly curled due to the cutting action. This would result in formation of a ball of removed flash within the tubing which would both be hard to remove and would foul the rotary cutter 21. For this reason provision is made for breaking the removed flash into short chips.

The preferred way of breaking the flash into short chips is to provide one or more interruptions in the periphery of the rotary cutter so that the chip will break off at each interruption. Preferably the cutter is provided with a plurality of such interruptions to break the flash into small chips which may be easily washed from the pipe with the cooling water used in cooling the machine. It is further preferred that the interruptions be helically extending grooves 22 in the periphery of the cutter. These grooves start at the front face 23 of the cutter and extend transverse to the direction of rotation thereof. While they are shown to extend completely transversely across the periphery of the cutter, it will be appreciated that this construction is for convenience in fabrication only as only the front portion of the lands 24 performs the cutting action when the cutter is rotating in the preferred direction.

Referring now to FIGURE 4, the cutter rotates in a clockwise direction when viewed from the top of the drawings. The tube moves across the cutter from top to bottom of the drawing. Thus beginning at the end of one of the lands there would be no cutting action until the tube had moved over the cutter a short distance and the next land had rotated into a position to engage the flash. The point of initial engagement would depend on the relative speeds of the cutter and tube being formed. Continued rotation of the cutter will wipe off a short chip of flash. The angle, shape and number of grooves is not critical, as these have been considerably varied and all forms tried have been found to work. The reason the rotary cutter breaks off the chip of flash is not completely understood, but it has been found that by merely interrupting the cutter the desired result will be obtained. It is apparent that the cutter could be run in counterclockwise direction and obtain the same result, but as it is difficult to keep the pointed ends of the lands sharp, it is preferred to run the cutter in a clockwise direction. While it is not necessary that the grooves extend all the way across the cutter, it is desired that each groove overlap the adjacent groove on each side so that irregardless of the speed of the cutter and the tube being formed, the flash will always be cut by the side wall of a land 24.

It will be appreciated that by rotating the cutter a new cutting edge is constantly presented to the flash and this will prevent overheating of the cutter.

While it is desired to remove the flash to within a maximum of a few thousandths of an inch from the tube wall, the cutter should not cut into the tube wall itself. As the wall is not always formed on a constant radius curve but undulates or varies slightly, means should be provided for preventing the rotary cutter from gouging into the tube wall. This means is provided by dimensioning the rotary cutter with a sufficiently large diameter relative to the tube diameter that when the cutter moves into engagement with the tube wall a large contact area between the periphery of the cutter and the wall of the tube is provided.

The chips from the cutter must pass by the cutter to prevent a buildup of chips which might interfere with the cutting operation. It has been found that the cutter may be of sufficiently small diameter to permit these chips to pass below the cutter or as an alternative the cutter may be provided with a series of slots 25 (see FIGURE 8). It has been found that the solid form of cutter will work satisfactorily, and this form is preferred. From the above it will be seen that it is desirable to have the cutter diameter sufficiently smaller than the tube diameter to permit cuttings to pass beneath the cutter. On the other hand the cutter should be sufficiently large that a bearing area is provided which will prevent the cutter from digging into the wall of the tube. It has been found that these dimensions are not critical and a wide range of diameters is available. As an example, a cutter having a diameter of 3.88 in. has been satisfactorily employed for milling 6⅝ in. pipe. Of course it will be appreciated that the form of cutter having holes extending therethrough might be slightly larger than the solid form of cutter, as cuttings will be washed through these holes.

While the cutter may be mounted and driven in any desired manner, the preferred drive and mounting is best shown in FIGURES 2, 6 and 7.

The cutter is keyed onto a shaft 20 which extends back toward the forming rolls and is mounted in bearing 26. Bearing 26 is located at a point in the forming rolls where the gap in the tube is still rather large. The bearing is mounted on a bracket 27 which depends from a suitable support 28. The bearing serves as a thrust bearing for the cutter 21. Rotation of the shaft 20 is provided by a sprocket drive indicated generally at 29 driven by a prime mover 31. It is desirable to position the cutter 21 with its periphery lying flat against the tube wall when in engagement therewith. For this purpose the bearing is located so that the shaft 20 is parallel to the central axis of the tube when the cutter is in cutting position. As it is desirable to be able to move the cutter to non-cutting position the bearing is preferably loose enough to permit slight downward movement of the cutter 21.

Any desired means of maintaining the cutter 21 in cutting position may be employed. Preferably this means is one which will permit movement of the cutter away from cutting position for ease in threading a new tube through the machine and then return the cutter to cutting position. In the preferred form illustrated, a support means indicated generally at 32 includes a pair of bars 33 and 34. The bars are generally rectangular in form, as best shown in FIGURE 7, and are held in spaced relation by a plurality of bolts 35 and spacer sleeves 36. The bars and bolts form in effect a U-shaped saddle which surrounds the drive shaft 20.

At a point closely adjacent the cutter 21 the support means is provided with a bearing 37 in which the drive shaft 20 is journaled. Spaced back along the support means from the bearing 37 a pair of fulcrum rollers 38 and 39 is provided. Preferably these rollers are positioned immediately over a roller for supporting the pipe, such as roller 41 (FIGURE 1). This will prevent distortion of the pipe by the fulcrum rollers. The support means is rotated about the fulcrum rollers to position the cutter head by a reciprocating means indicated generally at 42. As shown in FIGURE 1 the reciprocating means is fairly close to the welding wheel and the gap in the pipe being formed is now very small as shown in FIGURE 6. For this reason a blade 43 extends through the gap and is secured to the bars 33 and 34 as shown at 44 in FIGURE 6. The blade 43 is secured in a yoke 45 which depends from actuator rod 46. This rod 46 is supported in a guideway indicated generally at 47.

It is desirable to provide for some play in the mounting of blade 43 to permit it to give in the event it is rubbed by the pipe passing over it. For this season the yoke 45 is loosely secured to actuator rod 46 with a pin 48. This pin permits slight movement of the blade relative to the actuating rod so that the blade may be moved laterally by the pipe and avoid galling. In the fabrication of different sized pipe it is desirable to differently position the rotary cutter 21. As it is desirable to have the support means bushing 37 closely adjacent the rotary cutter, provision is made for moving the support means along the longitudinal axis of the drive shaft 20. In the preferred form the blade 43 is pinned to the clamp 45 with one or more bolts 49 passing through a slot 51 in the blade. By loosening bolt 49 the support means may be positioned as desired. Tightening up on bolt 49 in the slot 51 will clamp the support means in the desired position.

With reciprocation of the blade 43 the support means will rotate about fulcrum rollers 38 and 39 to raise and lower bearing 37. This bearing is loose enough about shaft 20 to permit raising and lowering of the rotary cutter 21 without bending the drive shaft 20. This will permit the rotary cutter to rotate about an axis which is substantially parallel to the central axis of the pipe.

Any desired means may be utilized to control the reciprocating means 42 and hence the position of the rotary cutter 21. For instance, a double acting fluid piston shown in dashed outline at 52 may be attached to the connecting rod 46 to reciprocate the rod. A 4-way valve 53 may be utilized to direct air from any desired source, such as pump 54, to either the bottom or top of the cylinder 55 in which the piston 52 is mounted. This will raise or lower the piston and determine the position of the rotary cutter 21. Preferably several hundred pounds of force are developed in the control means to firmly urged the rotary cutter into cutting position. As the air is compressible, it will provide a resilient support for the rotary cutter and permit slight movement of the rotary cutter to prevent the cutter gouging into the pipe. Of course this resilient feature could be provided by other means if desired.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a tube-forming machine having a plurality of rollers for shaping a continuous strip of metal into tubular form and a welder for welding the seam in the tube, a rotary cutter having means for removing flash from the tube and breaking the flash into chips, means for rotating the rotary cutter including a shaft extending longitudinally along the interior of the tube being formed, support means for the shaft, fulcrum rollers carried by the support means adjacent the rotary cutter adapted to bear on the tube being formed to provide a support for the rotary cutter and a fulcrum point about which the support means may be rotated, and means extending through the gap in the tube before it reaches the welder and attached to the support means at a point remote from said rollers for rotation of the support means about said rollers as a fulcrum to position the periphery of the rotary cutter for rotation in an arc which passes through the flash on the inside of the tube being formed.

2. In a tube-forming machine having a plurality of rollers for shaping a continuous strip of metal into tubular form and a welder for welding the seam in the tube, a rotary cutter having a diameter relative to the inner diameter of a tube being formed which is small enough to permit flash cuttings to pass between the rotary cutter and tube and large enough to provide a large area of contact with the tube wall when in contact therewith to prevent the rotary cutter from cutting into the tube wall on either side of the flash on the inside of a tube being formed, means for rotating the rotary cutter including a shaft extending longitudinally along the interior of the tube being formed, support means for the shaft, fulcrum rollers carried by the support means adjacent the rotary cutter and adapted to bear on the tube being formed to provide a support for the rotary cutter and fulcrum point about which the support means may be rotated, and means extending through the gap in the tube before it reaches the welder and attached to the support means at a point remote from said rollers for rotation of the support means about said rollers as a fulcrum to position the periphery of the rotary cutter for rotation in an arc which passes through the flash on the inside of a tube being formed, said cutter having an endwise facing discontinuous cutting surface for removing flash from the tube and breaking the flash into chips.

3. In a tube-forming machine having a plurality of rollers for shaping a continuous strip of metal into tubular form and a welder for welding the seam in the tube, a rotary cutter having a diameter relative to the inner diameter of a tube being formed which is small enough to permit flash cuttings to pass between the rotary cutter and tube and large enough to provide a large area of contact with the tube wall when in contact therewith to prevent the rotary cutter from cutting into the tube wall on either side of the flash on the inside of a tube being formed, means for rotating the rotary cutter including a shaft extending longitudinally along the interior of the tube being formed, support means for the shaft, a bearing carried by the support means and surrounding the shaft adjacent the rotary cutter, fulcrum rollers carried by the support means adjacent the cutter and adapted to bear on the tube being formed to provide a support for the rotary cutter and a fulcrum point about which the support means may be rotated, and means extending through the gap in the tube before it reaches the welder and attached to the support means at a point remote from said rollers for rotation of the support means about said rollers as a fulcrum to position the periphery of the rotary cutter for rotation in an arc which passes through the flash on the inside of the tube being formed, said cutter having an endwise facing discontinuous cutting surface for removing flash from the tube and breaking the flash into chips.

4. In a tube-forming machine having a plurality of rollers for shaping a continuous strip of metal into tubular form and a welder for welding the seam in the tube, a rotary cutter having a diameter relative to the inner diameter of a tube being formed which is small enough to permit flash cuttings to pass between the rotary cutter and tube and large enough to provide a large area of contact with the tube wall when in contact therewith to prevent the rotary cutter from cutting into the tube wall on either side of the flash on the inside of the tube being formed, means for rotating the rotary cutter including a shaft extending longitudinally along the interior of the tube being formed, support means for the shaft, fulcrum rollers carried by the support means adjacent the rotary cutter adapted to bear on the tube being formed to provide a support for the rotary cutter and fulcrum point about which the support means may be rotated, means extending through the gap in the tube before it reaches the welder and attached to the support means at a point remote from said rollers for rotation of the support means about said rollers as a fulcrum to position the periphery of the rotary cutter for rotation in an arc which passes through the flash on the inside of the tube being formed, and means for reciprocating the means extending through the gap to permit selective movement of the cutter into cutting position, said cutter having an endwise facing discontinuous cutting surface for removing flash from the tube and breaking the flash into chips.

5. The machine of claim 4 wherein the reciprocating means moves the rotary cutter into cutting position and thereafter applies a constant force to the support means to hold the rotary cutter in cutting position but will permit slight rocking of the support means about said rollers to accommodate slight movement of the cutter.

6. In a tube forming machine having; a plurality of rollers for shaping a continuous strip of metal into tubular form and a welder for welding the seam in the tube; a rotary cutter having a diameter relative to the inner diameter of a tube being formed which is small enough to permit flash cuttings to pass between the rotary cutter and tube and large enough to provide a large area of contact with the tube wall when in contact therewith to prevent the rotary cutter from cutting into the tube wall on either side of the flash on the inside of a tube being formed, said cutter having a plurality of grooves in the periphery of the rotary cutter beginning in the front face of the rotary cutter and extending helically thereabout with each groove extending about an arcuate section of the rotary cutter and overlapping adjacent grooves; means including a shaft for rotating the rotary cutter; and means for positioning the rotary cutter within a tube being formed with the periphery of the rotary cutter traveling in an arc which passes through the flash on the inside of a tube being formed and including, support means for the shaft, a bearing carried by the support means and surrounding the shaft adjacent the rotary cutter, fulcrum rollers on the support means bearing on the tube being formed, force applying means extending through the gap in the tube before it reaches the welding machine to rotate the support about its fulcrum rollers, and means for reciprocating the force applying means and for applying a constant force thereto to permit selective movement of the rotary cutter into cutting position and thereafter maintaining the rotary cutter in such position.

References Cited in the file of this patent
UNITED STATES PATENTS

| | | |
|---|---|---|
| 1,516,268 | Drissner | Nov. 18, 1924 |
| 2,279,738 | Praeg | Apr. 7, 1942 |
| 2,354,289 | Babb | July 25, 1944 |
| 2,581,449 | See | Jan. 8, 1952 |
| 2,654,292 | Pearson | Oct. 6, 1953 |
| 2,855,657 | Erhardt | Oct. 14, 1958 |
| 2,869,218 | Linder | Jan. 20, 1959 |
| 2,900,879 | Norton et al. | Aug. 25, 1959 |